Feb. 19, 1963

M. J. DUMAIRE 3,078,404

DIGITAL CONTROL SYSTEM FOR POSITIONING SHAFTS

Filed Dec. 8, 1959

Inventor
Marc Jean Dumaire
By Ralph B. Stewart
Attorney

United States Patent Office 3,078,404
Patented Feb. 19, 1963

3,078,404
DIGITAL CONTROL SYSTEM FOR
POSITIONING SHAFTS
Marc Jean Dumaire, Suresnes, France, assignor to Societe
d'Electronique et d'Automatisme, Courbevoie, France
Filed Dec. 8, 1959, Ser. No. 858,211
Claims priority, application France Dec. 19, 1958
9 Claims. (Cl. 318—162)

The present invention concerns improvements in or relating to the digital control of angular positioning of shafts from digital codes recorded character by character on such a carrier as a perforated or magnetic tape wherefrom they are read-out in as many spots as are characters in one complete digital control code. The number of characters in any digital control code is a constant quantity.

An object of the invention is to provide a digital control system of this kind capable to operate the shaft in a step-by-step fashion without any resetting to zero between any pair of successive steps, each step being controlled by an "algebraic" digital code, viz. a code determining an angle of rotation and the direction of said rotation of the controlled shaft. Such a control system may, for instance, be useful for controlling the movements of the tool carriage in a pointing machine.

According to the invention, a digital control system for positioning a shaft comprises the combination of first and second shafts, an index connected to the first shaft and an index position reader connected to the second shaft, means for controlling a step-by-step rotation of the first shaft from the successive code characters of a digital multi-character information code and simultaneously maintaining still the second shaft, and means for thereafter controlling the rotation of the second shaft up to the coincidence of the index carried by the first shaft and the null position of the read-out device connected to the second shaft and simultaneously maintaining still the first shaft during the control of said second shaft, and automatic switching means for continuously switching the said rotation control means of the first and second shaft in an alternate change-over of their operations.

According to a further feature of the invention, an encoder is connected to said first shaft and the control of the step-by-step movement of said first shaft from the characters of the read-out digital code is effected through a digital servo-mechanism receiving both signals from the digital code-bearing tape and the said encoder.

The invention will be fully described with reference to an illustrative embodiment thereof:

Figure 1:
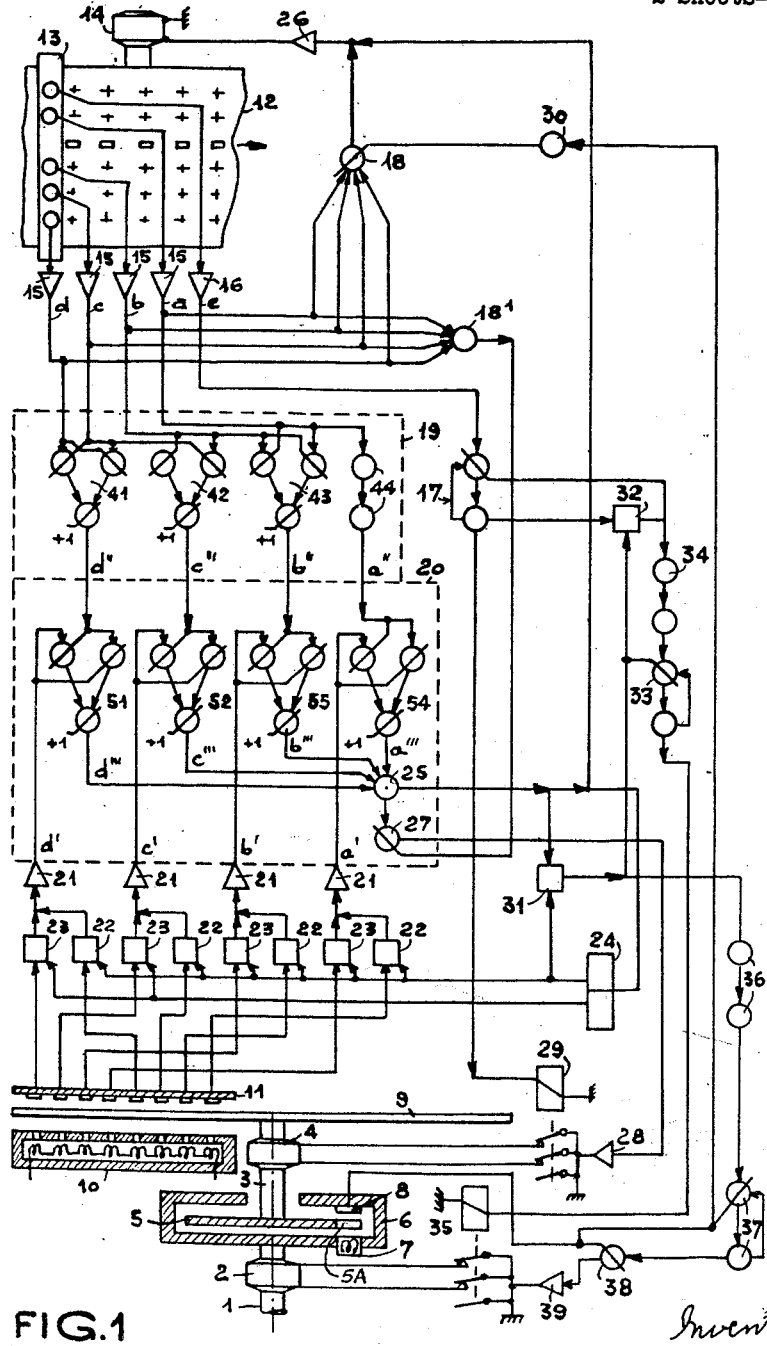
FIG. 1 shows the general arrangement of a control system according to the invention.

FIGS. 3A to E inclusive show elementary circuits useful in the arrangement of FIG. 1.

In this example of embodiment, in order to simplify and clarify the representation and description, each digital control code comprises only two significant digital characters and a "sign" character, viz. a character defining the direction of rotation of the shaft. The digital characters are given in the well-known decimal-binary (+3) code, viz. the unit and the denary digits are represented each by four binary digits on the input tape; the "sign" is represented by the existence or non-existence of a mark on the tape in a fifth column thereof. From this example, the extension of the system to any number of decimal digits is apparent.

Further, the "computing" circuitry is disclosed and described as using the well known magnetic core technique, though this of course is not imperative for putting the invention into actual practice.

Figure 2:
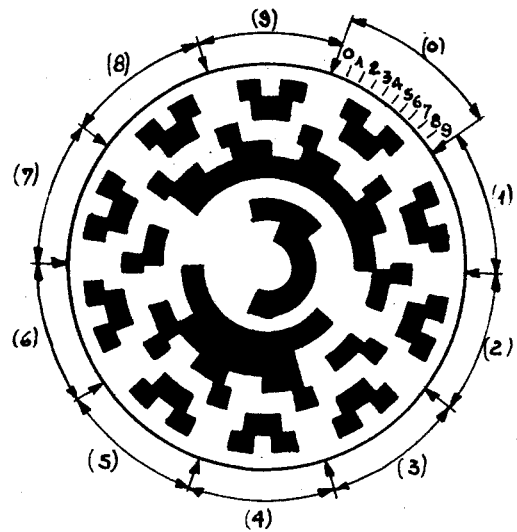
FIG. 2 shows a front view of an encoder for this system.

The shaft to be finally controlled is referred to at 1 and is driven, at appropriate time intervals from an electric motor 2. A presetting shaft 3 is driven into rotation, at other appropriate time intervals, from a motor 4. On the end of shaft 3 is supported an index made for instance of a disk 5 provided with a radial slot 5A. An index position reader 6 is supported by the end of shaft 1. This reader is made of two discoidal parts, one on either side of the index disk 5. One part carries a light source 7, the other one a photodiode 8. Also on the shaft 3 is supported an encoder disk 9 with which cooperate two fixed members, a light box 10 having eight light sources and a plate bearing eight corresponding photodiodes 11. These members are placed on opposite sides of the encoder 9. A plan view of this encoder disk 9 is shown in FIG. 2, it is for instance a sufficiently rigidified photographic film. If required a transparent supporting disc may be provided in association to the film. The digital codes are distributed thereon in the so-called reflected-binary numeration; each code must be read according to a radial direction on the disk and, as known, the use of such a system of representation as the reflected-binary one avoids uncertainty on the readings, when passing from a value of code to a further one since, then, this passage only necessitates the modification of a single digit for an increment of value of one unit or for a decrement of value of one unit. A decimal digit is defined by four binary digits, in the radial direction, so that disk 9 actually carries two concentric encoding rings, the inner one being divided into ten sectional portions representing the unit values from 0 to 9, and the outer ring being divided into ten times ten sectoral portions each one presents the said digital representations of 0 to 9 decimal digits. For a complete code, for instance, the denary decimal digit will be read from the inner ring and the unit decimal digit from the outer ring.

The input tape, which may be a perforated tape, is partially shown at 12, and is driven in a step-by-step motion under a row of reading heads 13 by a motor 14. As previously stated four columns are preserved on this tape for the binary digits of each decimal digit of a code and a fifth column or track is preserved for the marking of the sign of said digital code, the readout from the tape will thus concomitantly define the angle of rotation to impart to shaft 1 and the direction of said rotation.

From the reading heads 13 the binary bit signals are amplified in amplifiers, 15 for the digital bits and 16 for the sign representing bit. The outputs of the amplifiers 15 are denoted from $a$ to $d$, the output of 16 is denoted $e$; and the issuing signals will be similarly referred to. The binary bit $a$ is the one of lowest significance and the binary bit $d$, the one of highest significance for a decimal code defining a numerical value from 0 to 9. The output of 16 is connected to a single-digit store 17. The outputs of amplifiers 15 are first routed in a buffer or "union" arrangement to a transfer stage 18 and are on the second part, individually routed to four inputs of a true-binary to reflected-binary converter wherein each read-out binary-decimal code from the tape will issue as a corresponding reflected-binary four digit code.

The converter outputs are applied to as many inputs of a comparator circuit 20 receiving on a further group of four inputs, the output signals $a'$, $b'$, $c'$, $d'$ of amplifiers 21 receiving the signals read at 14 on the encoder disk 9 of the shaft 3. The read-out arrangement of this encoder disk comprises two groups, each of four outputs and it is through two gating circuit groups 22 and 23 that the routing is effected up to the inputs of the amplifiers 21. The routing control is ensured from a bistable member 24, the condition of which is controlled from the coincidence output of the comparator, in the stage 25 of this device, which output is also connected to the input of an amplifier 26 driving the motor 14 of the stepping of the perforated tape, as well as the output of the gate 18 drives this motor 14. Each time one of the said two signals appears, the motor 14 makes the tape advance by one step.

The motor 4 for the drive of the shaft 3 is fed from the output of an amplifier stage 28 controlled from the output stage 25 of the coincidence detecting circuit so that the output signal from this amplifier is always complementary (viz. the negative) of the signal from 25, each time an inhibiting signal from 18' is not present. The stage 18' receives as does 18, on its input, the four signals $a$ to $d$ in a buffer or union condition of action. The direction of rotation of motor 4 is controlled by change-over contacts of relay 29 fed from the single-digit store 17.

For the operation, it is necessary that, once the shaft 3 is positioned, it remains still during the time the shaft 1 gains its own position. But the second coincidence from 25 produces a one step movement of the perforated tape and consequently the introduction of a new "sign" signal into 17. It is then provided to inhibit the stage 27 by the union signal of the four bits $a$ to $d$, all of which are 0 in a sign representing row on the tape. This is made in stage 18[1]. As further the output signal from 18 must not at this time act upon the reader of the tape until shaft 1 has reached its final position, the output signal from 8 is applied as an inhibiting signal through a complementing stage 30 to the gating stage 18. The output signal from 8 will obviously be high only when the shaft 1 will be positioned according to the position of the shaft 3. The motor 2 of the shaft 1 must be activated after the detection at 25 of the second coincidence of signals from the tape and the encoder. Further, at the said second coincidence, the store 17 must be cleared for receiving the new "sign" signal from the tape. As the memory of the preceding sign must be preserved for the operation of shaft 1, it is provided to create a signal of coincidence between the second coincidence signal issuing from 25 and the routing voltage from 24 controlling the condition of conductibility of the gates 22 for the comparison of digital codes to be later on processed. This is made by means of a gate 31, and the output signal then ensures the following operations: clearing of the auxiliary single-digit sign store 33 and transfer into this store 33 of the content of the store 17, clearing of the said store 17; memorizing at 37 of the output signal from 31 after a delay at 36. The store 33 controls a relay 35 from the change-over contacts of which is controlled the direction of rotation of the motor 2 driving the shaft 1. The store 37 when it is thus activated ensures the activation of the output signal from a stage 38 which then controls, through amplifier 39 and the contacts of relay 35, the activation of the motor 2. The rotation of the motor (and consequently the shaft 1) will be stopped when the photo-diode 8 will receive the light beam from 7. The output signal from 8 will then ensure the inhibition of stage 38 and the clearance of the store 37.

The single-digit stores are shown as recirculating ones. They may be static members such as bistable circuits if required. Generally speaking the circuitry may advantageously be of the saturable magnetic core kind and, in this respect, reference will now be made to the elementary circuits of such a kind shown in FIGS. 3A to 3E.

Figure 3A:
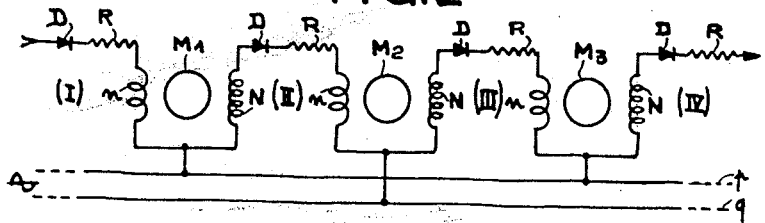

FIG. 3A shows a previously known arrangement of a transmission line for a binary information bit. In this figure are shown three magnetic cores of a material having a substantially rectangular hysteresis loop. These cores are referred to as $M_1$, $M_2$ and $M_3$. Each core is provided with a read-in winding $n$ and a read-out (and simultaneous reset) winding N. As is known, a core of such a hysteresis loop presents two stable magnetic conditions, remanent positive induction $+B_r$ and remanent negative induction $-B_r$. The windings $n$ and N on each core are so wound as to have opposite actions on the magnetic material when supplied by a current of a predetermined direction. These windings are for instance connected across the leads $p$ and $q$ of an A.C. character supply voltage. An A.C. character means that the waveform is of two polarities but not necessarily of sine shape. However, from stage to stage, the connections to said leads $p$ and $q$ are reversed. For instance, in FIG. 3A, the common terminal of windings $n$ and N of core $M_1$ is connected to the lead $p$, as is the corresponding terminal of the windings on core $M_3$, but the corresponding one of the windings on core $M_2$ is connected to the lead $q$.

The cascade arrangement of the magnetic stages is provided by means of interconnections from the free end of a winding N of a core to the free end of the winding $n$ of the next following core, through a diode D and a series resistor R. $M_1$ receives the input signal through such a network and $M_3$ routes its output signal through a similar network. These interconnection networks are referred to as (I) to (IV) on the drawing. The operation may be summarized as follows:

Assuming the input current to $M_1$ is at a lower value during an alternation of the supply passing through diode D preceding this stage, and that the action of the winding N on this core is such that the core is already in a $-B_r$ condition for instance, the next following alternation of the supply will produce a higher value current in the output of $M_1$ as the winding N presents a lower impedance value and the core is saturated. This current passing through the winding $n$ of $M_2$, will bring this latter core to the condition $+B_r$. For the following alternation of the supply, the core $M_2$ will be brought back to $-B_r$ from the current passing through the winding N thereof. The current then applied to $n$ of $M_3$ will be of a limited value due to the change-over of magnetic condition of $M_2$ and $M_3$ will remain at $-B_r$. At the following alternation of the supply, the output from $M_3$ will consequently be a higher value current; and so forth as long as the interconnecting network (I) will apply a lower value current to $M_1$. But if the current to $M_1$ comes to a higher value, the core is brought to $+B_r$ and is reset to $-B_r$ at the following supply alternation so that $M_2$ will remain at $-B_r$ but $M_3$ will be brought to $+B_r$ during the next alternation and will deliver a lower value current at the next following alternation of the supply.

Considering a lower value current to $M_1$ represents 0 and a higher value current to $M_1$ represents the value 1, the logical significance of the transfers becomes plain. Two cores per bit are useful and these cores are always representing the same digital values by complementary (or opposite) conditions in their magnetic conditions and also their output current conditions.

Several distinct signals may be applied to a single magnetic stage. For instance, in FIG. 3B, two signals are brought through input networks (I) and (I') to the input winding $n$ of a stage M. Several signals may be applied if required to a single core through separate $n$ windings. In such a case of multiple control, each time one at least of the input signals has a higher current value, the core M will be placed in the $+B_r$ condition. The output current from M will be high only when no one of the input signals is high. Such a stage effects a union or "OR" operation with complemented output.

Figures 3B, 3C:
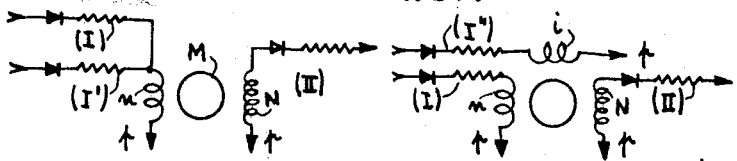

A magnetic core stage may also be provided, FIG. 3C, with an additional winding $i$ of a reverse direction of action with respect to that of the winding $n$ on the core. When a higher current signal is applied to this winding $i$ through the input network (I''), whether or not a higher level signal is simultaneously applied to the winding $n$, the core will not "move." This is an inhibition action from the additional signal with respect to the first.

Figures 3D, 3E:
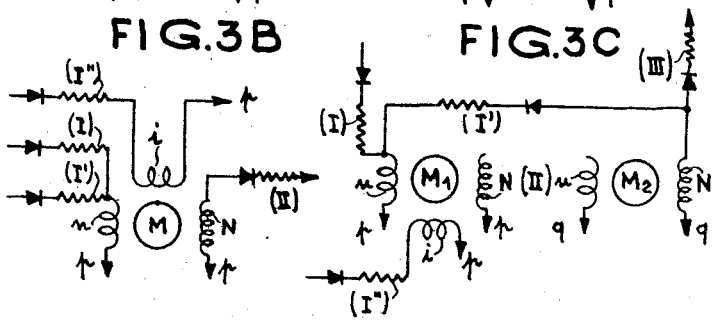

When, FIG. 3D, this inhibiting winding $i$ receives a permanently higher current signal, as being connected across the leads $p$ and $q$ of the supply, and the winding $n$ receives at least two input signals, the stage will operate an "AND" or intersection logical operation as it will be imperative that both signals in the n windings be at their higher current value for balancing out the inhibiting action of the current through the winding i of the core.

Finally, if as in FIG. 3E, the output signal from a core $M_2$ is brought back to the input of a core $M_1$ in addition to the actual input to said core, it is easy to see that this arrangement acts as a single-digit store in that, once the condition of the core $M_1$ determined by an input signal from (I), the condition of $M_2$ will permanently be opposite to that of $M_1$ and will act back to $M_1$ in order to restore the condition of $M_1$, until a clearing signal from the inhibiting input (II'') appears. More definitely, in the absence of a higher value current from (I), core $M_1$ retains its $-B_r$ magnetic condition so that $M_2$ is each alternation brought to $+B_r$ and then reset back to $-B_r$ (the store is cleared or contains 0); when a higher value input current appears, core $M_1$ is brought to $+B_r$ and reset to $-B_r$ at the alternation bringing $M_2$ to $-B_r$ so that the read-out of $M_2$ restores $M_1$ to $+B_r$ and so on (the store contains a 1).

Now the structure of the decimal binary to reflected binary converter may be defined with reference to circuits of FIGS. 3C and 3D. The law of conversion is well known per se and may readily be termed as follows:

Consider a decimal binary character formed of the four digits or bits:

$$a, b, c, d$$

read in the direction of the decreasing coefficients. The reflected binary character corresponding to that one, is formed by the digits or bits:

$$a, (a.\bar{b}+\bar{a}.b) \ (b.\bar{c}+c.\bar{b}) \ (c.\bar{d}+d.\bar{c})$$

The bar above the letter denotes as usual the complement of the value of the digit (in binary, 1's complement is 0 and 0's complement is 1).

The logical operation between parentheses is usually called "restricted-OR" and sometimes "disjunction."

The converter 19 comprises three "restricted-OR" circuits, 41, 42 and 43, delivering the three signals of the above-defined parentheses. Each circuit comprises two stages simultaneously activated by the supply and a further stage activated by the other phase of the supply. The delay is equal to a pulsation of the supply. The converter 19 includes a delay circuit of two stages, 44 for the transmission at the output of elementary signal $a$ which is not changed within the converter.

Considering for instance the circuit 41, the $c$ and $d$ signals are respectively applied, each one, as an input and an inhibition signal, to each one of the two paralleled stages. From the stage receiving $c$ as an inhibition signal, issues a signal:

Higher current for $d=0$ and $c=1$
Lower current for $d=1$ and $c=0$
Higher current for $d=0$ and $c=0$
Higher current for $d=1$ and $c=1$ From the stage receiving $d$ as an inhibition signal, issues a signal:

Lower current for $d=0$ and $c=1$
Higher current for $d=0$ and $c=0$
Higher current for $d=1$ and $c=1$
Higher current for $d=1$ and $c=0$ The said two signals are united on the input of the next stage receiving a permanent inhibition from the supply. Consequently from this latter stage issues the "restricted-OR" signal:

Higher current for $d=0$ and $c=1$
Higher current for $d=1$ and $c=0$
Lower current for $d=1$ and $c=1$
Lower current for $d=0$ and $c=0$ which is the required result.

The four output signals from the converter 19 are denoted $a''$, $b''$, $c''$ and $d''$. These signals are used in the comparator circuit 20 for comparison to the signals $a'$, $b'$, $c'$, $d'$ from the reading of the encoder 9. This comparator first includes four "restricted-OR" circuits 51 to 54 operating respectively on the signals $d'-d''$, $c'-c''$, $b'-b''$ and $a'-a''$. The output signals from 51 to 54 will be of higher current value only when the input signals represent different digital values, as explained above for the similar circuits of the converter. The complete coincidence of the two codes so compared will then be detected by the fact that four output signals $a'''$, $b'''$, $c'''$ and $d'''$ will simultaneously be lower current signals. Their buffer or union combination on stage 25 will indicate this result as this stage will then remain at $-B_r$ and issue a higher current value output signal unless one at least of the signals $a'''$ to $d'''$ is a higher current signal and consequently indicates that no coincidence is obtained. Obviously, the output of stage 27 cascaded with 25 will translate this coincidence and this non-coincidence conditions by signals reverses with respect to the signals issuing from 25 in said conditions.

The complete operation of the system shown in FIG. 1 may now be explained as follows:

As soon as positioning action of shaft 1 is ended, the signal from the photodiode 8 lighted from the coincidence of the slot 5A and the reader 6 suppresses the inhibition on the gate 18. The tape reader has been previously brought in position for reading a "sign" and stayed there. The bistable member 24 has been brought in the condition which unblocks gate 22 and stayed there. Stage 10' had ensured the inhibition of the stage 27 in order to maintain at rest the motor 4 of shaft 3. Finally the output signal from 8 ensures the reset of the signal-digit store 37 whilst inhibiting the gate 38 and consequently stopping the motor 2 at the angular positioning required for the shaft 1.

As soon as the gate 18 is made conducting, the tape reader advances by one step, which suppresses the inhibition on 27. The store 17 had previously recorded the direction of rotation of the motor 4 and this motor is then driven in the proper direction for searching a positioning of the shaft 3 bringing a coincidence of the codes of the denary digits on the tape and the encoder. When this coincidence is obtained, stage 25 issues the one step control signal for the tape reader and places the bistable member 24 in condition for unblocking gates 23 (gates 22 are then obviously blocked). In the denary sector, shaft 3 is then controlled for reaching the unit location wherein a coincidence is obtained from the encoder and the unit digit on the tape. Stage 25 issues a further concidence signal. This second coincidence signal advances the tape by one further step, produces at 31 a signal ensuring the transfer of the content of the store 17 to the store 33, previously cleared and, through the delay 36, places the store 37 in activated condition. The output from this store then activates the stage 38, uninhibited as soon as shaft 3 rotated at the beginning of the above described operation. Consequently, from stage 38, motor 2 is activated and rotates shaft 1 in the direction defined by the condition of the store 33. This rotation brings back the coincidence between the index 5 and the reader 6 so that, shaft 1 being suitably positioned, the whole set of operation is re-initiated for a further code on the tape; and so forth.

I claim:

1. A digital control system for positioning a shaft in accordance with digital codes read out from a tape upon which these codes are recorded in several characters the first of which gives the direction of rotation to be imparted to the shaft, comprising the combination of first and second shafts, a position indexing member connected to the first shaft, a position index reading member connected to the second shaft, means for controlling a step-by-step rotation of said first shaft from the reading-out of the characters of a digital code from the tape and simultaneously maintaining at rest the said second shaft, motor means for thereafter controlling the rotation of said second shaft up to the coincidence of the said position indexing member and said position index reading member, and automatic switching means for repeatedly activating the said first and second shaft rotation controlling means in an alternate change-over of their operations.

2. A digital control system according to claim 1, wherein a digital position encoder is connected to the said first shaft, read-out means from this encoder, comparing means at each step of the tape for deriving from the codes read-out from the tape and from the encoder an anticoincidence signal driving the said first shaft and a coincidence signal stopping the rotation of said first shaft and initiating the rotation of said second shaft, and means for deriving from the indexing members coincidence a further signal for re-initiating the reading-out of the tape and the activation of said first shaft rotation in accordance therewith.

3. A digital control system according to claim 2, wherein said encoder delivers reflected binary coded signals and a decimal binary to reflected binary converter is inserted between the reader of the tape and said comparing means.

4. A digital control system according to claim 2, wherein the direction character on the tape is stored when read-out into a single-digit store controlling a first relay means for the rotation of said first shaft and means for transferring the content of this store to a further store controlling second relay means for the rotation of said second shaft under the control of a coincidence signal marking the positioning of said first shaft in accordance with the read-out digital positioning code on the tape.

5. A digital control system according to claim 1, wherein said position indexing member is made of a disk provided with a radial slot and supported at the end of said first shaft and said position index reading member affixed to the end of the second shaft is made of two mechanically united parts, one of which carries a light source and the other one a photodiode in radial registration therebetween, said parts encasing said position index member.

6. A digital control system according to claim 2, wherein said encoder is made of a disk member bearing in coaxial relations as many groups of coding tracks as are digital characters in a digital code on the tape, these coding tracks having opaceous and translucent areas distributed therethrough, and said disk member being affixed to one end of said first shaft, and of a fixed casing enclosing said disk member and non-mechanically related thereto, one part of this casing carrying a plurality of radial light sources and the other part of this casing carrying a corresponding plurality of photodiodes in radial registration with said light sources.

7. A digital control system according to claim 6, wherein a number of groups of output gates equal to the number of decimal digits on the encoder is provided connected to the outputs of said photodiodes, and wherein switching means for sequentially and cyclically activating said groups of gates to the inputs of the said comparing means are placed under the control of the stepping signals of the tape reader.

8. A digital control system according to claim 7, wherein said stepping signals are made from a counter receiving the coincidence signals from the code comparing means.

9. A digital control system according to claim 8, wherein a further and distinct stepping signal for the tape reader is derived from the signal issuing from the coincidence of the said index position member on the first shaft and the index position reading member on the second shaft.

References Cited in the file of this patent
UNITED STATES PATENTS 2,770,798    Roth _____ Nov. 13, 1956
2,885,613    Myracle _____ May 5, 1959